United States Patent [19]
Allen

[11] 4,067,525
[45] Jan. 10, 1978

[54] RESILIENT MOUNTING
[75] Inventor: Jack Allen, Oak Park, Mich.
[73] Assignee: Bushings, Inc., Royal Oak, Mich.
[21] Appl. No.: 743,046
[22] Filed: Nov. 18, 1976
[51] Int. Cl.² .............................................. F16F 15/04
[52] U.S. Cl. ........................................ 248/10; 248/22
[58] Field of Search .... 248/10, 22, 358 R (U.S. only)
[56] References Cited
U.S. PATENT DOCUMENTS

| 2,147,660 | 2/1939 | Loewus | 248/10 X |
| 2,407,588 | 7/1946 | Thiry | 248/22 X |
| 2,538,658 | 1/1951 | Saurer | 248/22 |
| 2,689,136 | 9/1954 | Hendrickson | 248/10 X |
| 2,783,959 | 3/1957 | Boschi | 248/22 |
| 2,941,766 | 6/1960 | Van Ranst | 248/10 |

Primary Examiner—Francis K. Zugel
Attorney, Agent, or Firm—Barnes, Kisselle, Raisch & Choate

[57] ABSTRACT

A resilient mounting, such as used for marine engines, having a base provided with a cylindrical socket in which a resilient bushing is tightly compressed. The bushing extends above the socket at its upper end and the socket is designed so that the load on the bushing will be carried essentially in shear. A stud assembly is connected with the bushing and projects upwardly therefrom.

11 Claims, 3 Drawing Figures

RESILIENT MOUNTING

This invention relates to a resilient mounting of the type frequently employed for supporting a marine engine.

In U.S. Pat. No. 2,941,766 there is disclosed a motor mount which includes a base having a cylindrical socket therein in which an annular rubber bushing is firmly retained by compression. A threaded stem assembly is supported by the rubber bushing. The stem assembly and the base are formed with opposed curved flanges disposed at opposite ends of the bushing and arranged such that, when a vertical load applied to the stem assembly is progressively increased, the rubber bushing initially carries the load in shear which results in progressively decreasing deflection of the bushing until finally the entire bushing is in a state of compression rather than shear. While the mounting disclosed in the aforementioned patent has enjoyed commercial success, nevertheless experience has demonstrated that it has several inherent shortcomings. Under severe shock loads the bushing has a tendency to "bottom" against the base of the mounting. In addition, the prior mounting presented problems with respect to lateral stability.

The present invention has for its object the provision of a resilient mounting of the type described which overcomes the deficiencies of the prior mounting and which is designed for more economical manufacture.

More specifically, in the mounting of the present invention the height of the resilient bushing is sufficiently great in relation to its diameter to impart a high degree of lateral stability to the mounting. In order to prevent the bushing from being pulled out of its socket in the event of high shock loads, in the instant mounting, as in some prior art mountings of this type, the socket is formed with a radially inwardly projecting lip or flange at the upper end thereof which overlies the outer peripheral portion of the bushing. However, in the mounting of this invention the bushing is provided with a vertical extension above the peripheral flange on the socket which increases the capacity of the bushing to sustain both vertical and lateral loads and which also prevents grounding or interference contact between the stem assembly and the base. The bushing extension is conically shaped to insure that the vertical loading thereof will result in shear rather than compression.

Further objects, features and advantages of the present invention will become apparent from the following description and accompanying drawings, in which.

Figure 1:
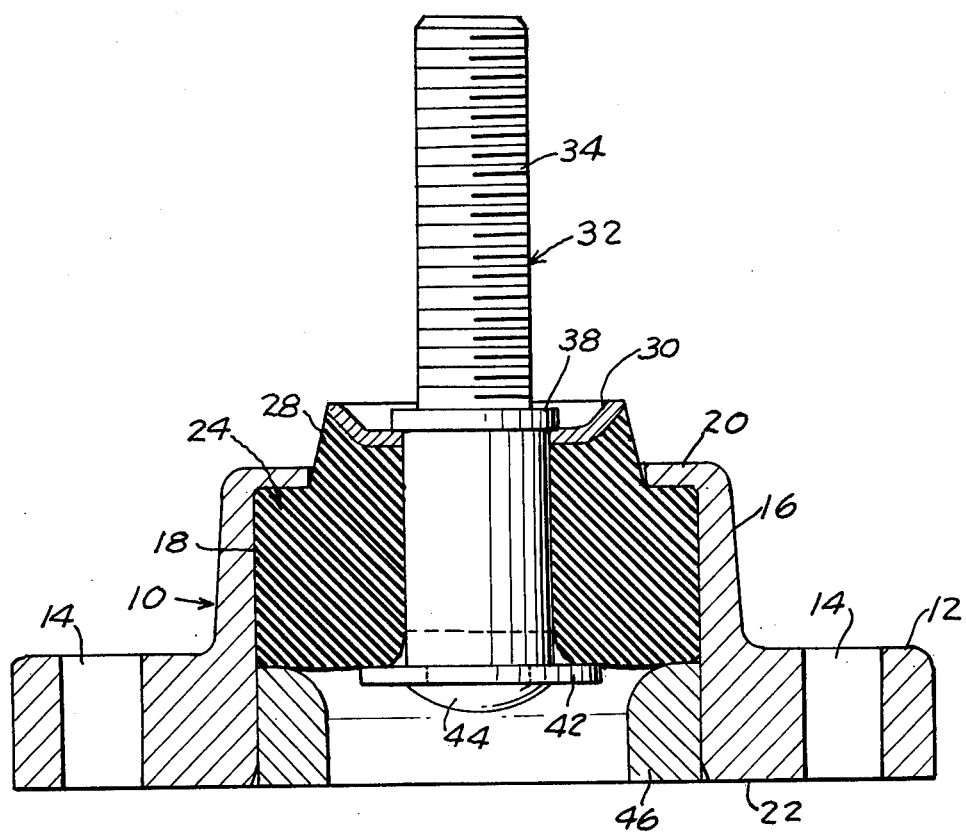
FIG. 1 is a sectional view of a resilient mounting embodying the present invention.
Figure 2:
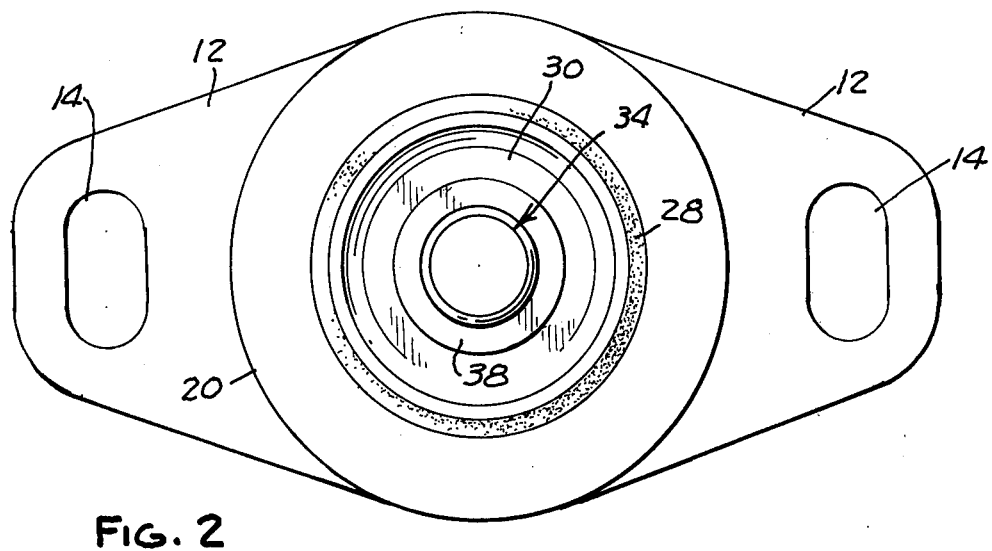
FIG. 2 is a plan view thereof.

The mounting of the present invention comprises a base 10 having a pair of laterally extending ears of lugs 12 formed with openings 14 for securing the mounting to a suitable support. Base 10 has an upstanding annular wall 16 defining a cylindrical socket 18. Wall 16 is turned inwardly at its upper end to define an annular flange 20. Socket 18 extends downwardly from flange 20 through the bottom face 22 of base 10.

Figure 3:
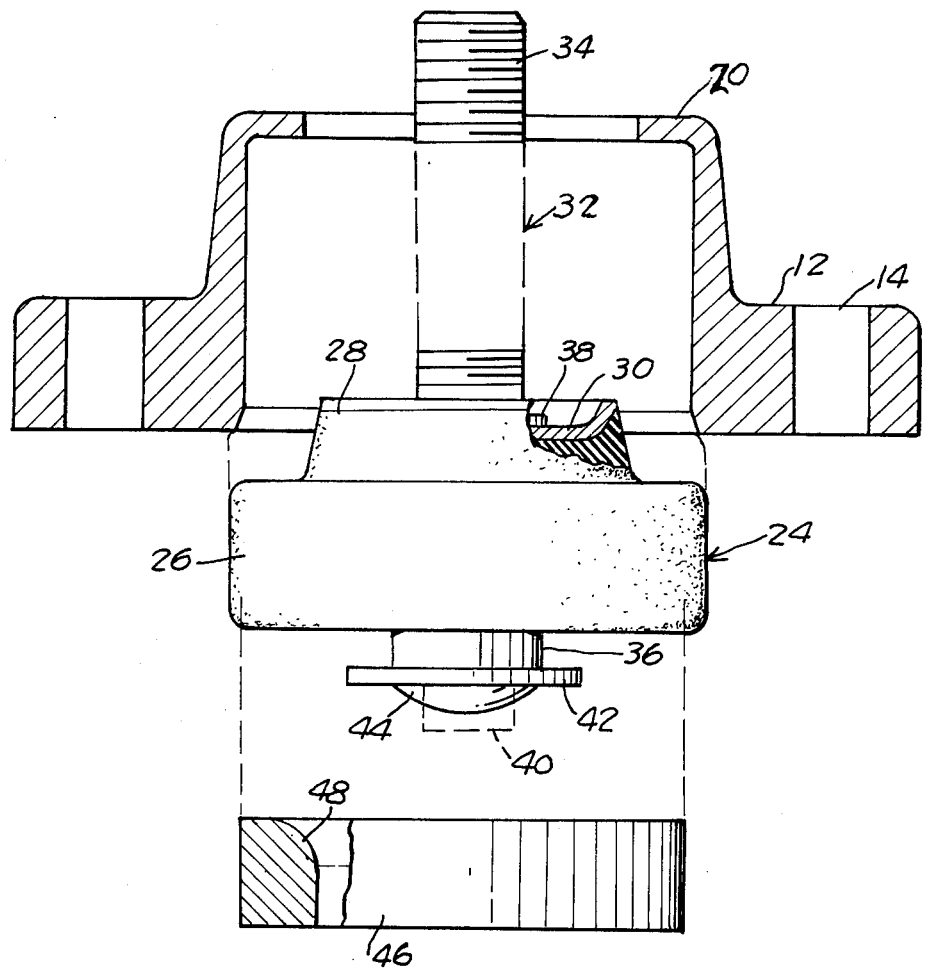
FIG. 3 is an exploded view, partly in section, showing the manner in which the mounting is assembled.

Within socket 18 there is arranged an annular bushing 24 formed of a resiliently compressible material, such as rubber. The shape of bushing 24 prior to assembly in socket 18 is illustrated in FIG. 3. It comprises a generally cylindrical body portion 26 having a concentric upwardly extending conical portion 28 at its upper end of reduced cross section. The upper end of conical extension 28 is concave and has a dished washer 30 vulcanized thereto. Washer 30 and bushing 24 are formed with a central through aperture for receiving a stud 32. Stud 32 has a threaded upper end portion 34 and a cylindrical shank portion 36 separated from the threaded portion 34 by a radially outwardly extending flange 38. The head of stud 32 is initially formed as an extension 40 of reduced cross section over which is fitted a washer 42. After the stud is inserted downwardly through the central aperture in washer 30 and bushing 24 the head extension 40 is peened as at 44 to firmly retain washer 42 at the lower end of the stud.

Shank portion 36 has a length greater than the vertical dimension of bushing 24 in its free condition as shown in FIG. 3. On the other hand, the body portion 26 of bushing 24 in its free condition has a diameter larger than the diameter of socket 18. When the assembly of bushing 24 and stud 32 is inserted in socket 18, the body portion 26 of the bushing is radially compressed so that its vertical dimension is increased to an extent such that the bushing is compressed between washers 30 and 42. After the assembly of bushing 24 and stud 32 is pressed into socket 18 to the position shown in FIG. 1, a ring 46 is press fitted into the lower end of socket 18. Ring 46 is formed with an inner rounded annular shoulder 48 at the upper end thereof. Ring 46 has a vertical dimension such that, when it is press fitted into the lower end of socket 18, the upper end thereof contacts the lower face of body 26 and the lower end thereof is flush with the bottom face 22 of base 10. The inner diameter of ring 46 corresponds generally with the outer diameter of washer 30.

One of the important features of the present invention relates to the relationship between the diameter and height of bushing 24 when assembled with base 10. If the diameter of the bushing is excessively large in relation to its vertical dimension, it is unable to withstand excessive vertical shock loads without "bottoming" against the support on which the base is mounted. At the same time, the relationship between the diameter of the bushing and its vertical dimension determines to a large extent its ability to withstand lateral loading. The ability to withstand lateral loading is particularly important when the mounting is used for supporting a marine engine. Such engines are sometimes supported in a slightly inclined position. In addition, the craft in which the engine is mounted frequently assumes an attitude substantially inclined to the horizontal. By reason of such inclination, it is important that the engine mounting be capable of withstanding substantial lateral loading, particularly such loading as might result from severe shock loads.

When the resilient mounting illustrated is subjected to a vertical load, bushing 24 initially carries the load in shear. However, by virtue of the fact that the peripheral outer portion of washer 30 and the annular shoulder 48 of ring 46 are curved oppositely away from one another, a progressively smaller portion of the bushing is placed in shear as the load on the bushing increases. As explained above, the bushing must be capable of sustaining not only a predetermined vertical load, but also substantial lateral loads. When stud 32 is subjected to lateral loads, it has a tendency to rock on base 10. I have determined that when the mounting is designed to sustain a particular maximum vertical load, the vertical dimension of the bushing between flange 20 and the upper face of ring 46 should be equal to at least about 35%, and preferably closer to 40%, of the diameter of the socket 18 in order to withstand the maximum lateral shock loads to which such mounting may be subjected.

In connection with lateral shock loads, the provision of extension 28 is important since it prevents grounding or interference contact between washer 30 and flange 20. Extension 28 also permits the use of a softer bushing material which absorbs shock loads more readily. Furthermore, the conical shape of extension 28 is highly desirable since it prevents the extension from bulging outwardly and being compressed downwardly against the top face of flange 20 when the mounting is subjected to substantial vertical loading. This is important since it is desired to carry the load primarily in shear rather than compression.

Preferably the total height of bushing 24 in the assembled condition of the mounting is equal to at least about one-half the diameter of socket 18. It is also preferable that the height of extension 28 is equal to at least about one-third of the total height of the bushing. When the bushing is so proportioned it is capable of withstanding the maximum vertical load for which it is designed, and, at the same time, is adapted to sustain the lateral components of severe shock loads which might be encountered under such loading.

In practice, base 10 is preferably formed as a casting, the socket 18 being formed simply by a cylindrical core in the casting mold. The casting is, therefore, of relatively simple design which lends itself to economical manufacture. The fact that the socket 18 extends continuously down to the bottom face 22 of the casting also enables the formation of the necessary shoulder 48 on a ring which is press fitted into the lower end of the socket. Thus, the design of the mounting not only enhances its performance characteristics, but also is adapted for economical manufacture and assembly.

I claim:

1. A resilient mounting comprising a base having a mounting face at its lower end and having means thereon for securing it to a support, said base having a vertically extending cylindrical socket therein which is open at the top and bottom of the base, said socket having a rigid radially inwardly extending, generally horizontal, peripheral flange at its upper end, a resiliently compressible bushing tightly retained within said socket, said bushing having a generally flat bottom face and an integral extension of reduced cross section at the upper end thereof projecting upwardly through the opening defined by said peripheral flange, the junction between said extension and the portion of the bushing within said socket being defined by a generally flat, horizontally extending, annular surface on the bushing compressingly engaging the underside of said peripheral flange, a stud extending vertically upwardly through said bushing, said stud having a radial flange at its lower end compressingly engaging said flat bottom face, a downwardly dished washer fixed on said stud and bearing downwardly on the upper end of the bushing throughout the extent of the upper end face thereof and means forming a rounded annular shoulder at the lower end of said socket bearing upwardly against said flat bottom face of said bushing around the outer peripheral portion thereof.

2. A mounting as called for in claim 1 wherein said last-mentioned means comprises a ring in said socket having a rounded shoulder extending around its inner periphery at the upper end of the ring.

3. A mounting as called for in claim 1 wherein said extension is conical.

4. A mounting as called for in claim 3 wherein said washer has a diameter at least slightly smaller than the opening defined by said peripheral flange at the upper end of the socket.

5. A mounting as called for in claim 4 wherein the lower end of said extension has a diameter corresponding generally to the diameter of the opening defined by the peripheral flange at the upper end of the socket and the upper end thereof has a diameter which corresponds generally with the diameter of the dished washer.

6. A mounting as called for in claim 5 wherein the inner diameter of said ring corresponds generally with the outer diameter of said dished washer.

7. A mounting as called for in claim 1 wherein the height of the portion of the bushing within said socket is equal to about at least 35% of the diameter of the socket.

8. A mounting as called for in claim 1 wherein the height of the portion of the bushing within said socket is equal to about at least 40% of the diameter of the socket.

9. A mounting as called for in claim 7 wherein the total height of the bushing, including said extension, is equal to at least about one-half of the diameter of the bushing.

10. A mounting as called for in claim 9 wherein the height of said extension is equal to at least about one-third the total height of the bushing.

11. A mounting as called for in claim 2 wherein said ring is press fitted into the lower end of said socket and has a bottom face substantially flush with said mounting face of said base.

* * * * *